United States Patent
Yi et al.

(10) Patent No.: US 9,594,742 B2
(45) Date of Patent: Mar. 14, 2017

(54) METHOD AND APPARATUS FOR MATCHING MISSPELLINGS CAUSED BY PHONETIC VARIATIONS

(71) Applicant: Acxiom Corporation, Little Rock, AR (US)

(72) Inventors: Gon Yi, Conway, AR (US); Aaron Miyahira, Conway, AR (US); Pavan Marupally, Conway, AR (US)

(73) Assignee: Acxiom Corporation, Little Rock, AR (US)

( * ) Notice: Subject to any disclaimer, the term of this patent is extended or adjusted under 35 U.S.C. 154(b) by 327 days.

(21) Appl. No.: 14/333,578

(22) Filed: Jul. 17, 2014

(65) Prior Publication Data
US 2015/0066474 A1   Mar. 5, 2015

Related U.S. Application Data

(60) Provisional application No. 61/873,902, filed on Sep. 5, 2013.

(51) Int. Cl.
*G06F 17/27* (2006.01)

(52) U.S. Cl.
CPC .......... *G06F 17/277* (2013.01); *G06F 17/273* (2013.01)

(58) Field of Classification Search
CPC ..................... G06F 17/273; G06F 17/277
See application file for complete search history.

(56) References Cited

U.S. PATENT DOCUMENTS

| | | | |
|---|---|---|---|
| 1,261,167 A | 4/1918 | Russell | |
| 1,435,663 A | 11/1922 | Russell | |
| 5,218,536 A * | 6/1993 | McWherter | G06F 17/273 707/E17.104 |
| 6,581,034 B1 * | 6/2003 | Choi | G06F 17/273 704/10 |
| 6,810,374 B2 * | 10/2004 | Kang | G06F 17/2863 704/2 |
| 6,873,986 B2 * | 3/2005 | McConnell | G06F 17/2863 |
| 7,010,487 B1 * | 3/2006 | Choi | G06F 17/2223 704/257 |
| 7,032,174 B2 | 4/2006 | Montero et al. | |
| 7,277,883 B2 | 10/2007 | DeVorzon et al. | |
| 7,467,087 B1 * | 12/2008 | Gillick | G10L 15/26 704/235 |

(Continued)

OTHER PUBLICATIONS

Pfeifer, Ulrich et al., "Searching Proper Names in Databases" (Oct. 31, 1994).

(Continued)

*Primary Examiner* — Brian Albertalli

(57) ABSTRACT

A method and apparatus for matching equivalent words across languages takes advantage of a set of rules that are built from a user-defined language specification (UDLS), which may be open source and customizable by a language expert. The UDLS is used to build a customer language library (CLL) that includes a list of consonants, a list of vowels, and rules defining phoneme equivalencies across two languages. The CLL is used to match equivalent words by both two-set and three-set matching to not only increase the number of true matches (i.e., overall accuracy), but also improve recognition of variations in a manner that is not language specific.

41 Claims, 4 Drawing Sheets

(56) References Cited

U.S. PATENT DOCUMENTS

| | | | |
|---|---|---|---|
| 7,472,061 B1* | 12/2008 | Alewine | G10L 13/08 704/243 |
| 7,877,375 B1 | 1/2011 | LeVan | |
| 8,103,506 B1* | 1/2012 | Meyer | G06F 17/27 704/237 |
| 8,239,463 B2 | 8/2012 | Malik | |
| 8,321,471 B2 | 11/2012 | Cucerzan | |
| 8,438,005 B1* | 5/2013 | Gupta | G06F 17/2223 704/10 |
| 8,438,011 B2 | 5/2013 | Udupa et al. | |
| 8,543,378 B1* | 9/2013 | Westphal | G06F 17/273 704/10 |
| 2001/0032073 A1* | 10/2001 | Boehme | G06F 17/30985 704/229 |
| 2004/0250208 A1 | 12/2004 | Nelms et al. | |
| 2005/0137991 A1 | 6/2005 | Bruce et al. | |
| 2005/0222838 A1* | 10/2005 | Gong | G06F 17/2223 704/5 |
| 2005/0278292 A1 | 12/2005 | Ohi et al. | |
| 2006/0112091 A1* | 5/2006 | Chapman | G06F 17/30669 |
| 2007/0061143 A1* | 3/2007 | Wilson | G06F 17/2735 704/252 |
| 2008/0010058 A1 | 1/2008 | Weng et al. | |
| 2008/0022198 A1 | 1/2008 | King | |
| 2008/0133522 A1 | 6/2008 | Bordner et al. | |
| 2009/0132237 A1* | 5/2009 | Gugenheim | G10L 15/187 704/10 |
| 2009/0144049 A1* | 6/2009 | Haddad | G06F 17/2223 704/3 |
| 2010/0167244 A1* | 7/2010 | Su | G10L 21/06 434/157 |
| 2011/0184723 A1* | 7/2011 | Huang | G06F 17/2705 704/8 |
| 2012/0016660 A1* | 1/2012 | Gillam | G06F 17/2715 704/8 |
| 2012/0078616 A1 | 3/2012 | White et al. | |
| 2012/0109636 A1* | 5/2012 | Iqbal | G06F 17/27 704/9 |
| 2013/0132069 A1* | 5/2013 | Wouters | G06F 17/28 704/8 |
| 2013/0253903 A1* | 9/2013 | Stephen | G06F 17/27 704/2 |
| 2014/0067373 A1* | 3/2014 | Wasserblat | G10L 15/02 704/9 |

OTHER PUBLICATIONS

Mazeika, Arturas et al., "Cleansing Databases of Misspelled Proper Nouns" (2006).
Navarro, Gonzalo et al., "Matchsimile: A Flexible Approximate Matching Toll for Searching Proper Names" (2003).
Hall, Patrick A. V. et al., "Approximate String Matching," ACM Computing Surveys, 12(4):381-402 (1980).
Branting, L. Karl, "Name Matching in Law Enforcement and Counter-Terrorism," ICAIL Workshop on Data Mining, Information Extraction, and Evidentiary Reasoning for Law Enforcement and Counter-Terrorism (2005).
Zhu, J. Joanne et al., "String Edit Analysis for Merging Databases," KDD Workshop on Text Mining, ACM SIGKIDD (2000).
Snae, Chakkrit, "A Comparison and Analysis of Name Matching Algorithms," World Academy of Science, Engineering and Technology 25 (2007).
Schnell, Rainer et al., "A Toolbox for Record Linkage," Austrian J. of Statistics, vol. 33, No. 1&2 125-133 (2004).
Branting, L. Karl, "Name-Matching Algorithms for Legal Case-Management Systems," J. of Information, Law and Technology (2002).
Bouchard, Gerard, "Population Studies and Genetic Epidemiology in Northeast Quebec," Can. Studies in Population, vol. 16 (1), pp. 61-86 (1989).
Snae, Chakkrit et al., "Hybrid Name Matching Methods for Rule Based Thai Naming System," NU Science J. 2(2):139-150 (2006).
Snae, Chakkrit et al., "Concept and Rule Based Naming System," Issues in Informing Science and Information Technology, vol. 3, 619-34 (2006).
Yancey, William E., "Evaluating String Comparator Performance for Record Linkage," ASA Sec. on Survey Research Methods (2005).
Jokinen, Petteri, "A Comparison of Approximate String Matching Algorithms," Software—Practice and Experience, 26(12):1439-1458 (1996).
Navarro, Gonzalo, "A Guided Tour to Approximate String Matching," ACM Computing Surveys, 33(1):31-88 (2001).
Gill, Leicester E., "OX-LINK: The Oxford Medical Record Linkage System," Record Linkage Techniques, pp. 15-33 (1997).
Olsen, Mark, "Theory and Applications of Inexact Pattern Matching: A Discussion of the PF474 String Co-Processor," Computers and the Humanities 22 pp. 203-215 (1988).
Zobel, Justin, et al., "Phonetic String Matching: Lessons from Information Retrieval" (1996).
Friedman, Carol, et al., "Tolerating Spelling Errors during Patient Validation," Computers and Biomedical Research 25, pp. 486-509 (1992).
Christen, Peter, "A Comparison of Personal Name Matching: Techniques and Practical Issues" (Sep. 2006).
Van Berkel, Brigitte et al., "Triphone Analysis: A Combined Method fro the Correction of Orthographical and Typographical Errors," Proc. of the Second Conf. on Applied Natural Language Processing, pp. 77-83 (1988).
Peterson, James L., "Computer Programs for Detecting and Correcting Spelling Errors," Computing Practices, Comm. of the ACM, vol. 23, No. 12 (Dec. 1980).
Knuth, Donald E., "Computer Programming as an Art," vol. 3, Sorting and Searching, Comm. of the ACM, vol. 17, No. 12 (Dec. 1974).
Kukich, Karen, "Techniques for Automatically Correcting Words in Text," ACM Computing Surveys, 24(4):377-439 (1992).
Lait, A.J. et al., "An Assessment of Name Matching Algorithms," Technical Report, Department of Computer Sci., Univ. of Newcastle upon Tyne (1993).
Pollock, Joseph J. et al., "Automatic Spelling Correction in Scientific and Scholarly Text," Comm. of the ACM, 27(4):358-68 (1984).
Snae, C. et al., "MetaSound: A New Phonetic Based Name Matching Algorithm for Thai Naming System" (May 15, 2007).

* cited by examiner

METHOD AND APPARATUS FOR MATCHING MISSPELLINGS CAUSED BY PHONETIC VARIATIONS

CROSS-REFERENCE TO RELATED APPLICATIONS

This application claims the benefit of U.S. provisional patent application No. 61/873,902, filed on Sep. 5, 2013, entitled "YMM—An Algorithm for Matching Misspellings Caused Due to Phonetic Variations in Romanized Foreign Languages." Such application is incorporated herein by reference in its entirety.

STATEMENT REGARDING FEDERALLY SPONSORED RESEARCH OR DEVELOPMENT

Not applicable.

BACKGROUND OF THE INVENTION

The present invention relates to a computerized method and apparatus for matching misspellings caused by phonetic variations, and in particular to such a method and apparatus that is applicable to the matching of proper nouns and other words transcribed into Romanized script from non-Roman languages.

In the data-driven environment of the world today, many businesses maintain or use large amounts of personal data that is recorded, processed, and standardized over a period of time. The vast volumes of data include the names and addresses of consumers and businesses. Such information may be collected from many different sources, with different formats and different degrees of accuracy and standardization. Retailers and others who collect this information may wish to correct, de-duplicate and standardize the information (i.e., data "hygiene"), or to supplement the data they have with additional information, either about existing customers or prospective customers. Very large, standardized databases containing this type of consumer information include the InfoBase product of Acxiom Corporation, which facilitates for retailers and others these functions, as well as additional functions such as real-time verification of a potential customer's identity. The success of these systems largely depends on the degree to which they can overcome discrepancies in variations or transcription errors in names, addresses, and other strings maintained in these records as collected from many different sources. String matching based on simple algorithms such as finding the distance between variations have proven ineffective, and hence more sophisticated phonetic variations or pattern matching algorithms must be applied.

The problem of name variations (either spelling or phonetic variations) and the difficulty of trying to match names based on identification of variations is greatly magnified when the information crosses between different languages, different language families, and different scripts applicable to those languages. These spelling and phonetic variations in proper nouns have been a consistent problem in various applications, particularly with respect to data hygiene applied to names, addresses, and other such terms on an international basis. One service in which this type of standardization is performed is Global Hygiene Services (GHS) offered by Acxiom Corporation. GHS is used for standardization of businesses, addresses, and names for more than one hundred countries across the world. Most of the information retrieval and storage systems at large data services providers have the inbuilt capability to record and process personal data from multiple sources. In such circumstances it is of utmost importance to be able to differentiate when references are made to the same entity or when duplicate entries exist, despite differences in language or script. This issue is encountered on a daily basis in hygiene systems such as GHS when a language expert is made responsible for standardizing a vast quantity of inputs. In such cases a language expert must spend a great amount of time and effort in identifying duplicates or matching proper nouns that are misspelled due to spelling or phonetic variations. Hence it is a non-trivial task to not only purge duplicates but also match proper nouns that are misspelled across different languages. These proper nouns may undergo several phonetic and spelling variations due to different pronunciations, naming conventions, languages, syllables, individual preferences, and cultural diversity. The failure of standardized algorithms for this purpose has required that much of this process be performed manually by such experts.

Most of the variations addressed in GHS and other data hygiene systems can be categorized as variations in spelling; variations in phonetics; or variations in character. Variations in spelling are primarily caused due to typographical errors (letters exchanged), unnecessary substitution during transcription, and the addition of letters or sometimes even deletion of characters (transposition). Usually such variations are caused due to mispronunciation or mishearing that does not affect the phonetic structure. Variations in phonetics occur where the structure of the proper noun is significantly modified due to alterations in phonemes. For example, the business name "Makudonarudo" in Japanese and "McDonald's" in English are related names but their phonetic structure appears completely different, increasing the complexity in matching them algorithmically. Variations in character include changes due to capitalization, punctuation, spacing, and abbreviations, which compared to the other problems are relatively well handled by data hygiene services when treated alone. But the combination of these variations, as well as potentially distinct words from different languages, makes the matching process a very challenging task.

It may be seen that the primary objective of matching in certain contexts as set forth above is to determine if two or more computer records relate to the same person, object, event, or other proper noun. One simple approach to string matching may be based on determining the "distance" between the two strings. A common string distance measure is the Levenshtein distance. The Levenshtein distance between two character strings is the minimum number of changes (such as adding a character to the string, deleting a character from the string, or replacing a character in the string with a different character) that must be made in order to transform one of the character strings into the other character string. It may be seen that Levenshtein distance is of limited utility in matching words based on phonetic differences, such as in the "McDonald's" example given above, since these two proper nouns may have many character changes that result in a high Levenshtein distance value even though the words are in fact related.

There are a number of algorithms in the prior art that have attempted to solve this phonetic matching problem in a general fashion, ranging from identifying simplistic variations to those that take phonetic variations into account. Many of these methods are language specific, with highly complex mechanisms for parsing and matching variations. Some of the most popular prior art methods include Soundex, Phonex, NYSISS, and Guth Matching.

Soundex was initially developed for use with English phonetics. The technique standardizes each variation by converting it to an equivalent four-character code. Several variations, such as Henry Matching and Daitch-Mokotoff coding for Slavic and German spellings, exist. A major disadvantage of Soundex and its variants is that it needs the first letter of the proper noun to be correct. Thus any spelling or phonetic variations at the beginning of the proper noun will eventually get propagated to the rest of matching, and result in a completely different Soundex code and thus a likely matching error.

Phonex is a prominent variation of Soundex, which includes the additional complexity of preprocessing proper nouns based on their English pronunciations before the actual encoding begins. As with Soundex, the leading character of the proper noun is still maintained, affecting only the remainder with increased complexity. This approach is also not language independent.

NYSIIS, based partly on Phonex, is a relatively slow algorithm with a high degree of complexity due to the application of hundreds of transformations at the beginning, middle and sometimes even at random positions of the string being analyzed.

Guth Matching is based on alphabetic characters from left to right and has many advantages over Soundex such as data independence, alternate spelling considerations, and does not need prior generation of a sorting key. The algorithm has proven to be relatively weak, however, when comparing shorter proper nouns.

A number of metrics may be applied to analyze these various prior art algorithms. Such metrics include the total number of pairs of known words in the dictionary by a language expert; the percentage of true matches; the percentage of true mismatches; the overall accuracy; the number of comparisons performed in the dictionary for rule generations; and the time of execution (i.e., the time taken or elapsed to match two unknown words not in the dictionary). None of these various known algorithms provide a high number of matches as measured by these various standards, and thus an improved apparatus and method for matching may be seen as highly desirable.

BRIEF SUMMARY OF THE INVENTION

According to certain aspects of the subject matter described in this specification, a computerized method and apparatus is presented for matching proper nouns and other terms despite phonetic variations. The algorithm employed by this method and apparatus first involves the creation of a compiled language library (CLL) file or files based on a user defined language specification (UDLS), and then the use of the CLL files in the matching process. The matching process is divided into two-set and three-set phases. Any mismatch in the comparison of tokenized sets after the two-set phase is passed through the three-set processing stage for further analysis. This two-set and three-set approach results in a simplified design, improved execution time, and a higher percentage of true matches (i.e., better overall accuracy) compared to prior art techniques.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Before the present invention is described in further detail, it should be understood that the invention is not limited to the particular embodiments described herein, and that the terms used in describing the particular embodiments are for the purpose of describing those particular embodiments only, and are not intended to be limiting, since the scope of the present invention will be limited only by the claims.

Figure 1:
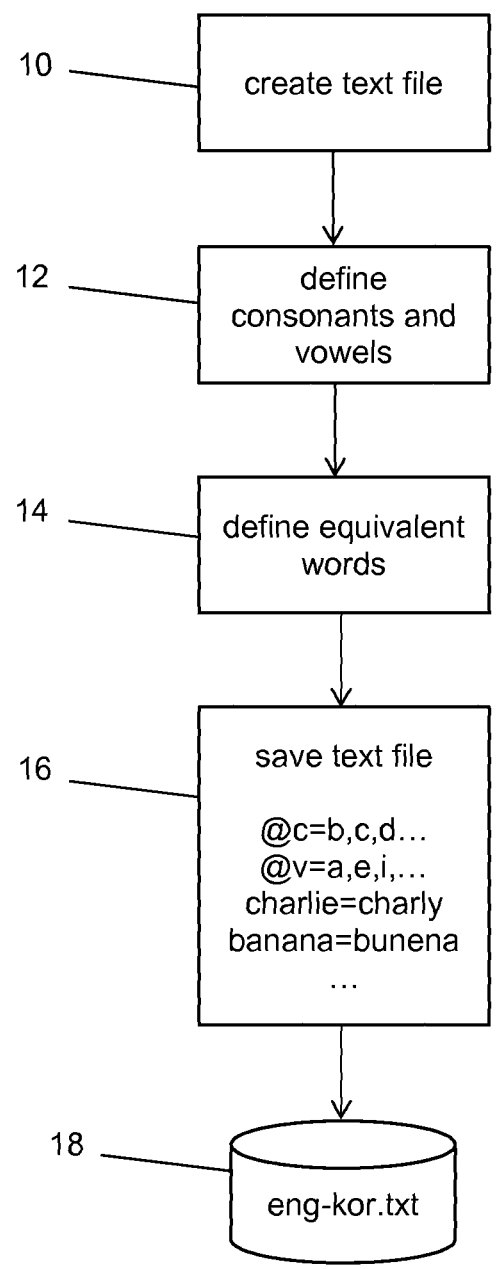
FIG. 1 is a flow chart that illustrates a sequence of steps involved in the creation of the user defined language specification (UDLS) according to certain embodiments of the present invention.
Figure 2:
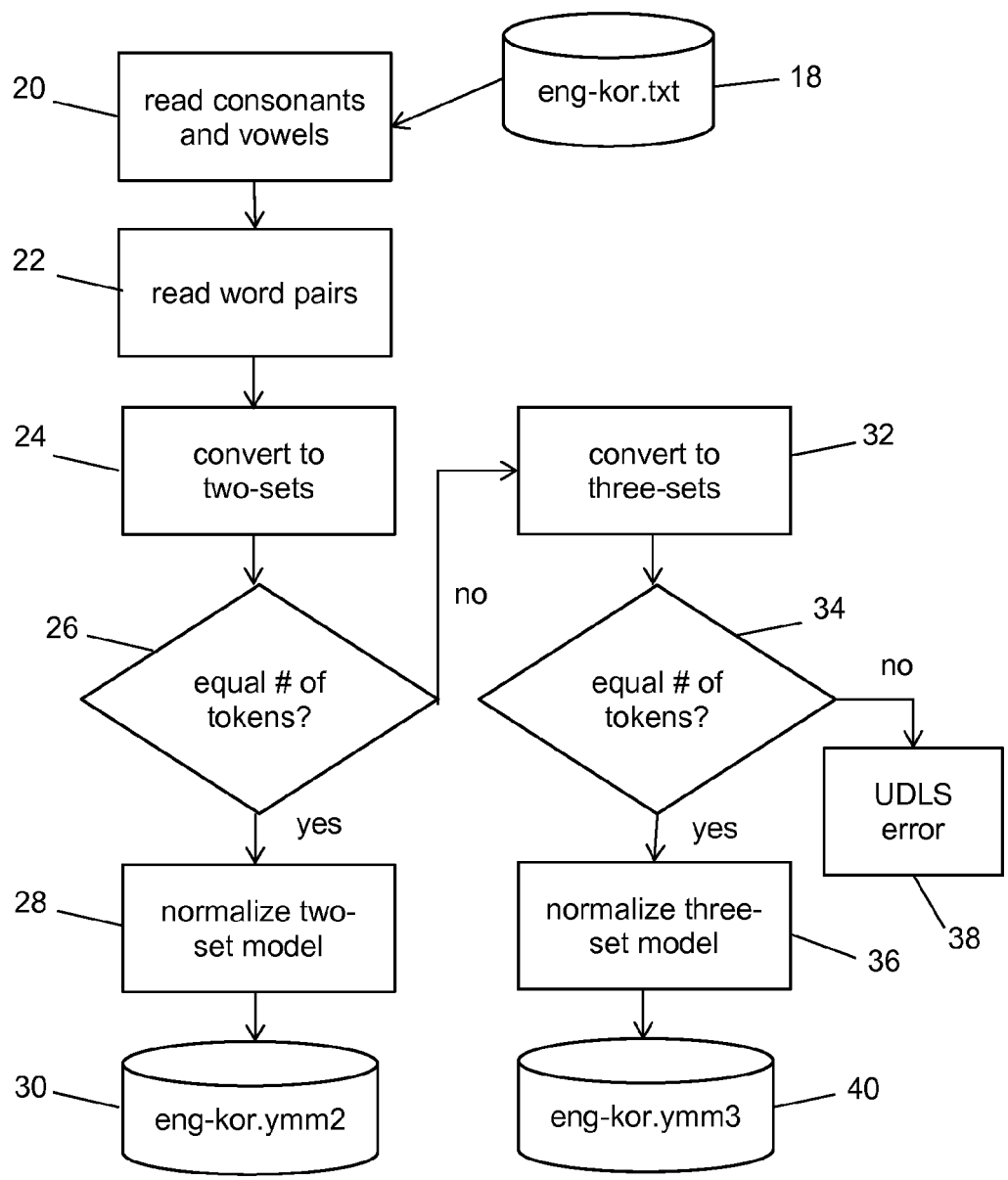
FIG. 2 is a flow chart that illustrates a sequence of steps involved in the creation of the compiled language library (CLL) files according to certain embodiments of the present invention.
Figure 3:
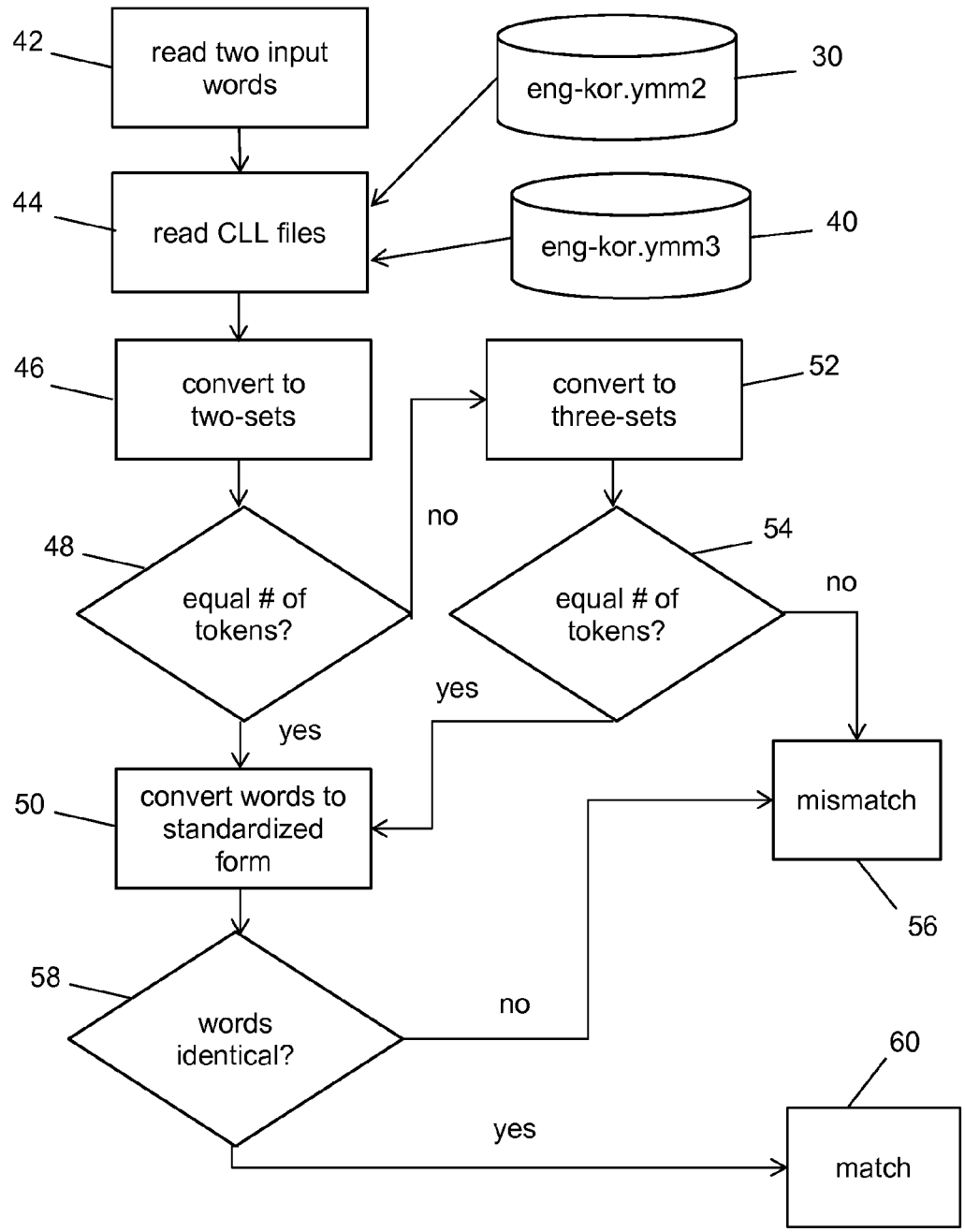
FIG. 3 is a flow chart that illustrates a sequence of steps involved in the two-step and three-step matching process according to a preferred embodiment of the present invention.

In certain embodiments, the computerized apparatus and method implements an algorithm that proceeds in a series of steps to first create a user defined language specification (UDLS), as shown in FIG. 1, create a compiled language library (CLL) file set, as shown in FIG. 2, and then perform matching to identify matched words despite phonetic/spelling differences, as shown in FIG. 3. The UDLS is a text file that, in certain embodiments, is necessary as a prerequisite to building the CLL files for a particular language-to-language matching process. It contains information compiled by a language expert. Each CLL is constructed using this information; the CLL that results from this process contains language-specific information, including equivalencies between letters and/or letter groups (phonemes) based on phonetic variations between the two languages employed. Once each CLL is constructed, then matching may be performed to determine if there is in fact a match between words, such that in many cases a match may be determined based on the specific phonetic differences that exist between pronunciation of words by speakers with different native languages despite the fact that the spellings of these two words may be quite different in terms of the actual characters employed. The apparatus and method allows for general application across any set of languages, since although the resulting CLL files are specific to the language employed, the process for constructing the CLL files is generally common to any set of languages. The example of FIGS. 1-3 is directed to the construction of English-to-Korean CLLs and that matching process, such that English words as pronounced by native Korean language speakers may be matched to standardized English spellings, but the invention is not limited to these particular languages or examples.

At step 10 of FIG. 1, the process begins with input from a language expert (or user) inputting certain key information for the languages at issue. A user-defined language specification (UDLS) will be constructed from this information. Preferably, the UDLS is constructed as a text file, although other forms may be employed in alternative embodiments.

At step 12, the expert identifies the consonant sounds or phonemes and vowel sounds or phonemes that exist for the language. These are input to the text file (saved in eng-kor.txt file 18 in the example of FIGS. 1-3) in a particular format to be used in constructing the CLL files. The text "@c=" is used to identify the series of consonant phonemes employed in the language, with each consonant phoneme being delimited by commas. Likewise, the text "@v=" is used to identify the series of vowel phonemes employed in the language. Although in some cases referred to herein simply as consonants and vowels, the defined consonant and vowel phonemes are not limited to single English letter characters, and may include multiple characters that form that particular phoneme. Thus the consonant phoneme "zh" is considered a consonant and the vowel phoneme "ae" is considered a vowel. Punctuation many also be included, as in the example of the consonant phoneme "d's" that corresponds to the possessive form in English for a word otherwise ending in the letter "d." For this particular example of English to Korean, the input for defined consonants and vowels may be as follows:

@c=b,c,d,f,g,h,j,k,l,m,n,p,q,r,s,t,v,w,x,z,ph,ch,sh,pp,ll,rl, th,wh,ts,rh,d's,zh,z z,gg,mm

@v=a,e,i,o,u,y,ae,ai,eo,eu,ie,ay, ea, ee, ou

At step 14, the language expert inputs a number of words that are known to be equivalent (pronounced identically) despite different spellings across the two languages, in this case English to Korean. The "=" sign is used to indicate the equivalency, with each word pair being on a separate line for delineation. For this particular example, a portion of the input at step 3 may be as follows:

egg=egeu
car=ca
tommy=tomi
banana=bunena
fox=pox
research=lisuchi
zoo=joo
pak=bak
result=rezhert
pizza=pija
for=po
feel=pil
phil=pil
soup=supeu
park=pakeu The file eng-kor.txt 18 is created that includes this data, which in certain examples may be a text file but is not so limited. The file is saved to a database or other computer-readable medium at step 16 for use in constructing the CLL. The file may also be retained in memory and read directly in subsequent processing without the requirement of the intermediate storage step.

The resulting UDLS file is preferably entirely customizable and in certain embodiments made available as an open source template. Language experts across the world could thus access the UDLS, add in matches extending the UDLS, and improve the overall matching process in a collaborative, open environment in order to allow the UDLS to continually improve as its number of users increases.

Turning now to FIG. 2, the UDLS is used to build the compiled language library (CLL). The UDLS is read from the database at step 20, and the set of consonants and vowels are extracted from the UDLS to use in further processing. The method then steps through each pair of equivalent words in the UDLS at step 22. At step 24, each word in the word pairs is converted or "tokenized" to a two-set form.

Tokenization in two-step form is the division of each word into consonant-vowel pairs, where the symbol "#" is a placeholder that represents a missing vowel, and the symbol "*" is a placeholder that represents a missing leading consonant. Groups of zero or one consonants are combined into a consonant set, and groups of zero or one vowels are combined into a vowel set, resulting in a two-set that contains a consonant and a vowel or a placeholder for a missing consonant or vowel. Thus in the general case of consonant "C" and vowel "V," the possible forms are CV, C#, and *V. By way of example, the word "egg" becomes [*,e], [gg,#], where the missing leading consonant at the beginning of the word is denoted in the first two-set by the "*" symbol, and the missing vowel at the end of the second two-set by the "#" symbol. These special characters account for any missing or omitted vowel or consonant sequence in the input, making the technique more resistant to phonetic variations as well as making the approach more dynamic. the equivalent word "egeu" from the UDLS becomes [*,e][g,eu] when tokenized into two-set form.

At step 26, the processing proceeds to determining whether the number of two-sets that result from the process of step 24 are equal between the two equivalent words, i.e., do they have the same number of tokens. If (as in the "egg"/"egeu" example) they do, since both words result in two tokens, then processing moves to step 28, in which the two-sets are compared to determine phonetically equivalent spelling variations. Continuing with the "egg"/"egeu" example, it may be determined from the two-set comparison that "#" and "eu" are equivalent. This is recorded as a rule in the resulting two-set CLL, in a comma-delimited fashion with each rule being delineated from the other by separate lines. As the process is repeated for each equivalent word pair in which the number of tokens are equal after two-set tokenization, the two-set CLL is built, denoted here as eng-kor.ymm2 file 30. The list of consonants and vowels from the UDLS is also included. This file, including the consonant and vowel definitions, may be a text file that takes a form such as follows:

@c=b,c,d,f,g,h,j,k,l,m,n,p,q,r,s,t,v,w,x,z,ph,ch,sh,pp,ll,rl, th,wh,ts,rh,d's,zh,z z,gg,mm
@v=a,e,i,o,u,y,ae,ai,eo,eu,ie,ay, ea, ee, ou
mm,m
y,i
gg,g
f,p,b,ph
a,u,e,i,ea,#,ee,ou,eu
r,l
z,j
s,zh
zz,j

It may be noted that in the construction of the CLL file, normalization takes advantage of the fact that these rules are both transitive and associative. Thus, for example, rules a=b and b=a are equivalent, and further it may be seen that if a=b and b=c, then a=c. These properties allow for substantial reduction in the size of the CLL because the rules that are expressed may be reduced by these properties in the normalization and deduplication process.

If it is determined at step 26 than the number of tokens are not equal after conversion to two-set form, then processing proceeds to conversion of the words to three-set form at step 32. The addition of three-set matching improves the overall accuracy by filtering through the set of true mismatches outputted from the two-set matching process. Consider, for example, the equivalent words "car" and "ca." Using two-set tokenization at step 24, the resulting two-set tokens would be [c,a] and [r,#] for "car," and [c,a] for "ca." It may be seen that the former word results in two tokens from two-set matching, while the latter has only one. This is a mismatch that would cause processing to proceed to step 32 because the number of tokens resulting from two-set matching are unequal.

Tokenization in three-step forms is the division of each word into consonant-vowel-consonant sets, where the symbol "#" represents a missing vowel, "*" represents a missing leading consonant, and "ˆ" represents an optional trailing consonant. Groups of zero or one leading consonants are combined into a leading consonant set, groups of zero or one vowels are combined into a vowel set, and groups of zero or one trailing consonants are combined into an optional trailing consonant set, resulting in a three-set. Thus in the general case of consonant "C" and vowel "V," the possible forms are CVC, *VC, CVˆ, #V*, and C*ˆ. By way of example, the term "car" becomes [c,a,ˆr], and the term "ca" becomes [c,a,ˆ]. A leading "ˆ" symbol is used with the trailing optional "r" character in this example in order to distinguish it from a leading "r," which as will be seen is processed differently.

At step 34, the processing proceeds to determining whether the number of token three-sets that result from the process of step 32 are equal between the two equivalent words, i.e., do they have the same number of tokens. If not, then both two-set and three-step tokenization has failed, and it is determined that the user must have made an error when constructing the UDLS, which is reported at step 38. Otherwise, if there is a match between the number of tokens as in the "car"/"ca" example, then processing moves to step 36, in which the three-sets are compared to determine phonetically equivalent spelling variations. Continuing with the "car"/"ca" example, it may be determined from the three-set comparison that "ˆr" and "ˆ" are equivalent. (Note again that the optional trailing consonant is here denoted with a "ˆ" character in order to distinguish it from a leading "r" consonant.) This equivalency is recorded as a rule in the resulting three-set CLL, in a comma-delimited fashion, as was the case with the two-set CLL, with each rule being delineated from the other by separate lines. As the process is repeated for each equivalent word pair in which the number of tokens are equal after three-set tokenization, the three-set CLL is built, denoted in this example as eng-kor.ymm3 file 40. This file, including the consonant and vowel definitions and two-set equivalencies with the new three-set equivalency added, may take a form such as follows:

@c=b,c,d,f,g,h,j,k,l,m,n,p,q,r,s,t,v,w,x,z,ph,ch,sh,pp,ll,rl, th,wh,ts,rh,d's,zh,z z,gg,mm
@v=a,e,i,o,u,y,ae,ai,eo,eu,ie,ay, ea, ee, ou
mm,m
y,i
gg,g
f,p,b,ph
a,u,e,i,ea,#,ee,ou,eu
r,l
ˆr,ˆ
z,j
s,zh
zz,j

Three-set tokenization calls for special processing in various embodiments of the invention. In the case of a word having two or more consecutive vowels, such as "au," if "au" is not defined in the list of vowels "@v" in the UDLS, then these two letters will be recognized as two separate tokens. The result of this processing would be the following three-set tokens: [#,a,ˆ] [#,u,ˆ]. The same type of processing is applied to a word with two or more consecutive consonants. In the case of a token having a trailing consonant, but in which the next token does not have a leading consonant, then the trailing consonant is assigned to the leading consonant of the next token. So for example, in the case of the word "booky," the three-set tokenization would not be [b,oo,ˆk] [#,y,ˆ], but would instead be [b,oo,ˆ] [k,y,ˆ].

Although in certain embodiments there are separate files built from the two-set and three-set matching processes, in other embodiments these results may be written to a single file or any other number of files for further processing. It may be noted that in various examples the UDLS that results from this process may be a very large file, containing a great many word equivalences, but that the process of creating the CLL files from this UDLS will generally result in a very small, compact file or files due to rule normalization and deduplication, thus enabling fast processing when the file or files is used in the subsequent matching process. It may be seen that one of the strengths of the method and apparatus according to certain embodiments is its adaptability. A language expert could easily increase the accuracy of true matches by adding a simple set of variations into the freely accessible UDLS file. The algorithm would compare the words, build sets and derive rules for the CLL automatically. The newly defined rules may then be applied across various phonetic variations of unknown words. The accuracy of the system continually improves as the UDLS grows.

Turning now to FIG. 3, the process of matching any two words to determine equivalency once the CLL file or files are constructed may be described. At step 42, the two words to be compared are read for processing. These words may be received from storage media or an input device, or from another location across a network. In the following examples, the two examples of words for matching will be "photo" against "poto" and "tartar" against "tata." The CLL files are read into processing at step 44; in this particular example, as will be described, a two-set CLL file is read in from source 30 and the three-set CLL file is read in from source 40. At step 46, the words are broken into two-set tokens. For the example of the words "photo" and "poto," the resulting two-sets will be [ph,o] [t,o] and [p,o] [t,o], respectively. At step 48, it is determined whether the number of tokens is equal, and since in this case there are two tokens for each term resulting from two-set tokenization, processing moves to step 50 to convert the words into standardized form. This process is performed using the CLL rules from eng-kor.ymm2 file 30. Since the CLL rules contain the rule that ph=p, the tokenization for [ph,o] is standardized to [p,o]. It may be thus seen that, in response to the query at step 58, both the words "photo" and "poto" standardize according to the CLL rules to be identical. In this case, a match is returned at step 60. Had the words not been found equivalent based on the CLL rules, then a mismatch would be returned at step 56.

As an alternative to or in addition to returning a binary match or mismatch result, in certain embodiments the algorithm could also return a value that reflects the degree of similarity along a spectrum, such as a match percentage. A similarity measure could help the user correct a problem in the UDLS due to incorrect input data, and thereby lead to an improvement in the overall matching process. This similarity measure may be derived, for example, from the Levenshtein distance for the two proper nouns being matched. This alternative of providing a similarity measure to improve the UDLS is possible because the UDLS in various embodiments, as explained above, is fully customizable.

Returning to the processing at step 46, and now considering the second example of "tartar" against "tata," it will be seen that the two-set tokenization results in the tokens [t,a] [r,#] [t,a] [r,#] and [t,a] [t,a], respectively. The number of tokens does not match, and thus processing moves to three-set tokenization at step 52. In this case, these two words are tokenized as [t,a,r] [t,a,r] and [t,a,ˆ] [t,a,ˆ]. If the number of tokens did not match at step 54 after three-set tokenization as well, then a mismatch is returned at step 56. In this case, since the number of tokens resulting from three-set tokenization is the same, processing moves to step 50 where standardization occurs. Using the three-set CLL rules from the file eng-kor.ymm3 40 that was read into memory at step 44, the trailing "r" and the "ˆ" empty trailing consonant are found to be equivalent, and thus in this case it is found that the words are identical. Processing thus moves to return a match at step 60. If there were no match, then a mismatch would be returned at step 56.

It may be seen from the foregoing description that in the certain embodiments described, the invention not only identifies proper nouns that are equivalent but not necessarily identical in their original written form, but also drastically reduces the amount of time required by a language expert in manually inspecting millions of possible matches. The algorithm is not language specific and can be applied to match proper nouns and other words from one language to another across various domains such as addresses or business names. The algorithm not only identifies phonetic variations across disparate languages but also looks for common spelling variations such as additions, substitutions, replacements or omissions introduced during transcription errors. Furthermore, while in the preferred embodiment two-set and three-set tokenization are performed, variations could include tokenization to sets of any size and any combination of those various sizes. For example, two-set tokenization could be employed alone to improve speed, or additional tokenization could be added in an attempt to improve accuracy.

Many other applications for the invention are possible. For example, the present invention in certain embodiments may be applied to significantly improve the quality of voice recognition systems. Many of the existing voice identification systems suffer from modification of one or more phonemes that substantially alters the structure of the word itself. The algorithm allows for the identification of reasonable alternatives of the original word without being language specific. In an example focusing on native speaker and non-native speaker differences, the phrase "flight to San Francisco" can be recognized as phonetically equivalent to "feulait tu sen feuraencisko" by voice recognition software. But for certain non-native speakers of English, such as a native Korean language speaker, the equivalent phonetics may be "peulait tu sen pulancisko," which will not be recognized by traditional voice recognition software as equivalent. By normalizing the differences as set forth herein, the quality of such voice recognition software may be significantly improved for this speaker. In a particular application, the method may allow configuration for the native language of the non-native speaker. For example, in this case there may be a setting for "English speaker" and "native Korean language speaker."

Further, the present invention in certain embodiments may be enhanced in its accuracy by incorporating additional classes of equivalent proper nouns for additional or existing ethnicities. The translation capability of the algorithm supports searching for a proper noun across a multitude of domains in one language or script against those written in other languages or scripts. Hence the algorithm handles matching needs across a global space by supporting multiple languages or scripts such as where the dictionary is made public domain, open source, or shared and may be customizable by language experts across the world.

Figure 4:
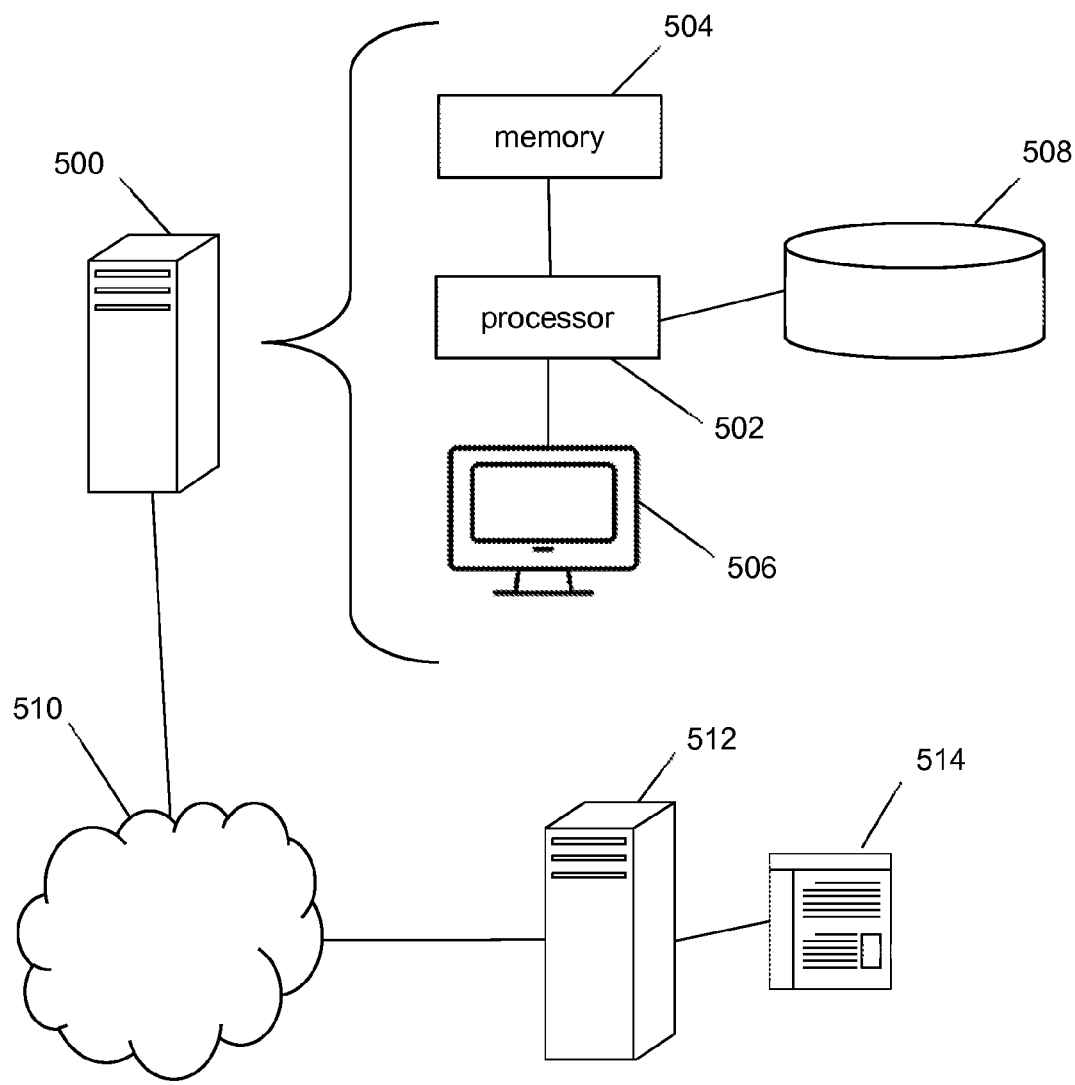
FIG. 4 is an illustration of a computer network according to certain embodiments of the present invention.

The preferred embodiment of the invention is implemented as a computing device 500 as illustrated in FIG. 4, which is programmed by means of instructions to result in a special-purpose computing device to perform the various functionality described herein. Computing device 500 may be implemented in a number of different forms. For example, it may be implemented as a standard computer server as shown in FIG. 5; as a group of servers; as a personal computer; or as a laptop computer.

Computing device 500 includes microprocessor 502, memory 504, an input/output device or devices such as display 506, and storage device 508, such as a solid-state drive or magnetic hard drive. Each of these components are interconnected using various buses or networks, and several of the components may be mounted on a common PC board or in other manners as appropriate.

Microprocessor 502 may execute instructions within computing device 500, including instructions stored in memory 504. Microprocessor 502 may be implemented as a single microprocessor or multiple microprocessors, which may be either serial or parallel computing microprocessors.

Memory 504 stores information within computing device 500. The memory 504 may be implemented as one or more of a computer-readable medium or media, a volatile memory unit or units such as flash memory or RAM, or a non-volatile memory unit or units such as ROM. Memory 504 may be partially or wholly integrated within microprocessor 502, or may be an entirely stand-alone device in communication with microprocessor 502 along a bus, or may be a combination such as on-board cache memory in conjunction with separate RAM memory. Memory 504 may include multiple levels with different levels of memory 504 operating at different read/write speeds, including multiple-level caches as are known in the art.

Display 506 provide for interaction with a user, and may be implemented, for example, as an LCD (light emitting diode) or LCD (liquid crystal display) monitor for displaying information to the user, in addition to a keyboard and a pointing device, for example, a mouse, by which the user may provide input to the computer. Other kinds of devices may be used to provide for interaction with a user as well.

Various implementations of the systems and methods described herein may be realized in computer hardware, firmware, software, and/or combinations thereof. These various implementations may include implementation in one or more computer programs that are executable and/or interpretable on a programmable system including at least one programmable microprocessor 502, which may be special or general purpose, coupled to receive data and instructions from, and to transmit data and instructions to, a storage system, one or more input device, and one or more output device.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A computer-implemented method for identifying phonetic equivalents between words spoken in a natural source language by native speakers of the source language and words spoken by non-native speakers of the source language who natively speak a common natural second language, comprising the steps of:
   a. receiving at a processor in communication with a computer-readable medium a first term and a second term, wherein each of the first term and second term comprises a character string stored on the computer-readable medium and at least one of the first and second terms is derived from a non-native speaker of the source language;
   b. tokenizing at the processor the first term and the second term to create a first tokenized set comprising a plurality of first tokens from the first term and a second tokenized set comprising a plurality of second tokens from the second term, wherein each of the first tokens and second tokens comprises at least one consonant or consonant placeholder, and at least one vowel or vowel placeholder;
   c. after the tokenizing step, comparing at the processor each first token from the first tokenized set with a corresponding second token from the second tokenized set to determine if the first tokenized set comprises an equal number of tokens as the second tokenized set;
   d. if the first tokenized set comprises an equal number of tokens as the second tokenized set, comparing the characters in each of the first tokens in the first tokenized set to the characters in the corresponding second token from the second tokenized set to determine if a match exists between the first term and the second term, wherein said comparison step is performed using a first compiled language library (CLL) comprising a set of equivalent consonant pairs and a set of equivalent vowel pairs, wherein an equivalence exists if the characters in each of the first tokens in the first tokenized set are identical to the characters in the corresponding second token from the second tokenized set or if the first tokens in the first tokenized set are equivalent to the characters in the corresponding second token from the second tokenized set, wherein consonant equivalencies and vowel equivalencies are found based on a phonetically identical pronunciation of such consonants and vowels by the non-native speakers of the source language who natively speak the common second language; and
   e. outputting from the processor an indicator of whether the first and second terms are phonetic equivalents.

2. The computer-implemented method of claim 1, wherein the tokenizing step comprises a two-set tokenization step.

3. The computer-implemented method of claim 2, wherein the two-step tokenization step comprises the step of combining groups of zero or one consonants into a consonant set and combining groups of zero or one vowels into a vowel set to create a two-set token.

4. The computer-implemented method of claim 3, wherein a first placeholder symbol is used to represent a missing consonant in each two-set token comprising zero consonants.

5. The computer-implemented method of claim 4, wherein a second placeholder symbol is used to represent a missing vowel in each two-set token comprising zero vowels.

6. The computer-implemented method of claim 5, wherein if the first tokenized set comprises a different number of tokens as the second tokenized set, further comprising the step of performing three-step tokenization.

7. The computer-implemented method of claim 6, wherein the step of performing three-step tokenization comprises the steps of:
   a. tokenizing at the processor the first term and the second term to create a third tokenized set comprising a plurality of third tokens from the first term and a fourth tokenized set comprising a plurality of fourth tokens from the second term, wherein each of the third and fourth tokens comprises at least one leading consonant or leading consonant placeholder, at least one vowel or vowel placeholder, and at least one trailing consonant or trailing consonant placeholder;
   b. after the tokenizing step, comparing at the processor each third token from the third tokenized set with a corresponding fourth token from the fourth tokenized set to determine if the third tokenized set comprises an equal number of tokens as the fourth tokenized set;
   c. if the third tokenized set comprises an equal number of tokens as the fourth tokenized set, comparing the characters in each of the third tokens in the third tokenized set to the characters in the corresponding fourth token from the fourth tokenized set to determine if the first term and the second term are phonetically equivalent, wherein said comparison step is performed using a second compiled language library (CLL) comprising a set of consonants, a set of vowels, and a plurality of leading consonant equivalencies, vowel equivalencies, and trailing consonant equivalencies, whereby an equivalence exists if the characters in each of the third tokens in the third tokenized set are identical to the characters in the corresponding fourth token from the fourth tokenized set or if the third tokens in the third tokenized set are equivalent to the characters in the corresponding fourth token from the fourth tokenized set; and
   d. outputting from the processor an indicator of whether the first and second terms are phonetic equivalents.

8. The computer-implemented method of claim 7, further comprising the steps of calculating a similarity measure between the first term and the second term, and output from the processor the similarity measure.

9. The computer-implemented method of claim 8, wherein the calculation of the similarity measure comprises a Levenshtein distance calculation.

10. The computer-implemented method of claim 7, wherein the first CLL and second CLL are stored in a single file on the computer-readable medium.

11. A computer-implemented method for building a compiled language library for establishing the equivalence of words from a source language as spoken by non-native speakers of the source language who natively speak a common second language, comprising the steps of:
 a. receiving at a processor from a computer-readable medium in communication with the processor a user-defined language specification (UDLS), wherein the UDLS comprises a plurality of consonants, a plurality of vowels, and a plurality of sets of equivalent natural language terms, wherein each set of equivalent terms comprises a first term and a second term that differ in spelling but are phonetically equivalent with respect to native speakers of the second language, and wherein each of the first and second term comprise a character string;
 b. for each of the plurality of sets of equivalent terms, tokenizing at the processor the first term and the second term to create a first tokenized set comprising a plurality of first tokens from the first term and a second tokenized set comprising a plurality of second tokens from the second term, wherein each of the first tokens and second tokens comprises at least one consonant from the UDLS or consonant placeholder, and at least one vowel from the UDLS or vowel placeholder;
 c. after the tokenizing step, comparing at the processor each first token from the first tokenized set with a corresponding second token from the second tokenized set to determine if the first tokenized set comprises an equal number of tokens as the second tokenized set;
 d. if the first tokenized set comprises an equal number of tokens as the second tokenized set, comparing the consonants or consonant placeholders and vowels or vowel placeholders in each of the first tokens in the first tokenized set to the consonants or consonant placeholders and vowels or vowel placeholders in the corresponding second token from the second tokenized set to determine if the characters are identical, and if the characters are not identical then creating a rule indicating the equivalency of the consonants or consonant placeholders and vowels or vowel placeholders, and writing the rule to a first compiled language library (CLL), wherein the rule comprises at least one of a pair of consonants or a pair of vowels; and
 e. storing the first CLL on the computer-storage medium.

12. The computer-implemented method of claim 11, wherein the tokenizing step comprises two-set tokenization.

13. The computer-implemented method of claim 12, wherein the two-step tokenization step comprises the step of combining groups of zero or one consonants into a consonant set and combining groups of zero or one vowels into a vowel set to create a two-set token.

14. The computer-implemented method of claim 13, wherein if the first tokenized set comprises a different number of tokens as the second tokenized set, further comprising the step of performing three-step tokenization.

15. The computer-implemented method of claim 14, wherein the step of performing three-step tokenization comprises the steps of:
 a. tokenizing at the processor the first term and the second term to create a third tokenized set comprising a plurality of third tokens from the first term and a fourth tokenized set comprising a plurality of fourth tokens from the second term, wherein each of the third and fourth tokens comprises at least one leading consonant or leading consonant placeholder, at least one vowel or vowel placeholder, and at least one trailing consonant or trailing consonant placeholder;
 b. after the tokenizing step, comparing at the processor each third token from the third tokenized set with a corresponding fourth token from the fourth tokenized set to determine if the third tokenized set comprises an equal number of tokens as the fourth tokenized set;
 c. if the third tokenized set comprises an equal number of tokens as the fourth tokenized set, comparing the characters in each of the third tokens in the third tokenized set to the characters in the corresponding fourth token from the fourth tokenized set to determine if the characters are identical, and if the characters are not identical then creating a rule indicating the equivalency of the leading consonants or leading consonant placeholders, vowels or vowel placeholders, and trailing consonants or trailing consonant placeholders, and writing the rule to a second compiled language library (CLL), wherein the rule comprises at least one of a pair of consonants or a pair of vowels; and
 d. storing the second CLL on the computer-storage medium.

16. The computer-implemented method of claim 15, wherein the three-step tokenization step comprises the step of combining groups of zero or one leading consonants into a leading consonant set, combining groups of zero or one vowels into a vowel set, and combining groups of zero or one trailing consonants into an optional trailing consonant to create a three-set token.

17. The computer-implemented method of claim 16 wherein a first symbol is used to represent a missing leading consonant in each three-set token comprising zero leading consonants.

18. The computer-implemented method of claim 17 wherein a second symbol is used to represent a missing vowel in each three-set token comprising zero vowels.

19. The computer-implemented method of claim 18, wherein a third symbol is used to represent a missing optional trailing consonant in each three-set token comprising zero trailing consonants.

20. A computerized system for establishing the equivalence of phonetically equivalent words of a first language with different spellings, comprising:
 a. a compiled language library (CLL) stored on a computer-readable medium, wherein the CLL comprises:
  i. a plurality of consonant phonemes;
  ii. a plurality of vowel phonemes; and
  iii. a plurality of equivalent letter pairs, wherein each of the plurality of equivalent letter pairs comprises a first phoneme and a second phoneme that are spelled differently but are phonetically identical with respect to non-native speakers of the first language but who natively speak a common second language;
 b. a processor in electronic communication with the computer-readable medium on which the CLL is stored;
 c. a random access memory (RAM) in electronic communication with the processor; and
 d. a computer program product stored on the computer-readable medium, comprising instructions that, when read into the RAM and executed on the processor, cause the processor to:
  i. receive a first term and a second term, wherein each of the first term and second term comprises at least one character;

ii. tokenize the first term and the second term to create a first tokenized set comprising a plurality of first tokens comprising at least one phoneme and a second tokenized set comprising a plurality of second tokens comprising at least one phoneme;

iii. after the process tokenizes the first and second term, compare the first tokenized set to the second tokenized set to determine if the first tokenized set comprises an equal number of tokens as the second tokenized set;

iv. determine if the first tokenized set comprises an equal number of tokens as the second tokenized set, and if so compare the first tokens to the second tokens to determine if the tokens are identical or phonetically equivalent, wherein two tokens are phonetically equivalent if they are equivalent in the CLL; and v. output from the processor an indicator if the first term and the second term are phonetically equivalent.

21. The computerized system of claim 20, wherein the computer program product stored on the computer-readable medium further comprising instructions that, when read into the RAM and executed on the processor, cause the processor to, when comparing the first tokens to the second tokens to determine if the tokens are identical or phonetically equivalent, compare a first phoneme in the first token to a second phoneme in the second token, determine if the first phoneme and second phoneme are identical, and if not read the matched equivalencies in the CLL to determine if the first phoneme and second phoneme are phonetically equivalent.

22. The computerized system of claim 21, wherein the computer program product stored on the computer-readable medium further comprise instructions that, when read into the RAM and executed on the processor, cause the processor to tokenize the first term and the second term by two-set tokenization.

23. The computerized system of claim 22, wherein the computer program product stored on the computer-readable medium further comprise instructions that, when read into the RAM and executed on the processor, cause the processor to tokenize the first term and the second term by combining groups of zero or one consonants into a consonant set and combining groups of zero or one vowels into a vowel set to create a two-set token.

24. The computerized system of claim 23, wherein the computer program product stored on the computer-readable medium further comprise instructions that, when read into the RAM and executed on the processor, cause the processor to tokenize the first term and the second term by inserting a first placeholder symbol to represent a missing consonant in each two-set token comprising zero consonants.

25. The computerized system of claim 24, wherein the computer program product stored on the computer-readable medium further comprise instructions that, when read into the RAM and executed on the processor, cause the processor to tokenize the first term and the second term by inserting a second placeholder symbol to represent a missing vowel in each two-set token comprising zero vowels.

26. The computerized system of claim 25, wherein the computer program product stored on the computer-readable medium further comprise instructions that, when read into the RAM and executed on the processor, cause the processor to, if the first tokenized set does not comprise an equal number of tokens as the second tokenized set, tokenize the first term and the second term by three-step tokenization.

27. The computerized system of claim 26, wherein the computer program product stored on the computer-readable medium further comprise instructions that, when read into the RAM and executed on the processor, cause the processor to:

a. tokenize the first term and the second term to create a third tokenized set comprising a plurality of third tokens comprising at least one phoneme and a fourth tokenized set comprising a plurality of fourth tokens comprising at least one phoneme;

b. after the processes tokenizes the first term and the second term, compare the third tokenized set to the fourth tokenized set to determine if the third tokenized set comprises an equal number of tokens as the fourth tokenized set;

c. determine if the third tokenized set comprises an equal number of tokens as the fourth tokenized set, and if so compare the third tokens to the fourth tokens to determine if the tokens are identical or phonetically equivalent; and d. output from the processor an indicator of whether the first term and second term are phonetically equivalent.

28. A method for real-time verification of a potential customer's identity utilizing a microprocessor, comprising the steps of:

a. receiving at the microprocessor across a network a first character string and a second character string, wherein each of the first character string and second character string is a text representation of a proper noun represented in a first language;

b. in real time, tokenizing at the microprocessor the first character string and the second character string to create a first tokenized set comprising a plurality of first tokens from the first character string and a second tokenized set comprising a plurality of second tokens from the second character string, wherein each of the first tokens and second tokens comprises at least one consonant or consonant placeholder, and at least one vowel or vowel placeholder;

c. in real time, analyzing at the microprocessor each first token from the first tokenized set and a corresponding second token from the second tokenized set to determine if the first tokenized set comprises an equal number of tokens as the second tokenized set;

d. if the first tokenized set comprises an equal number of tokens as the second tokenized set, analyzing the characters in each of the first tokens in the first tokenized set and the characters in the corresponding second token from the second tokenized set to determine in real time if a match exists between the first character string and the second character string, wherein said analyzing step is performed using a first compiled language library (CLL) comprising a set of consonants, a set of vowels, and a plurality of consonant pairs and vowel pairs, wherein the consonant pairs and vowel pairs are pairs of letters that represent an equivalent sound when spoken or heard by a person whose native language is a second language different from the first language, and wherein a correspondence exists if the characters in each of the first tokens in the first tokenized set are identical to the characters in the corresponding second token from the second tokenized set or if the first tokens in the first tokenized set are phonetically equivalent to the characters in the corresponding second token from the second tokenized set; and e. if a correspondence exists in step (d) above, outputting in real time across the network a result from the microprocessor indicating that the potential customer's identity is verified, and if a correspondence does not exist in step (d) above, outputting across the network in real time a result from the microprocessor indicating that the potential customer's identity is not verified.

29. The method of claim 28, wherein the tokenizing step comprises a two-set tokenization step.

30. The method of claim 29, wherein the two-step tokenization step comprises the step of combining groups of zero or one consonants into a consonant set and combining groups of zero or one vowels into a vowel set to create a two-set token.

31. The method of claim 30, wherein a first placeholder symbol is used to represent a missing consonant in each two-set token comprising zero consonants.

32. The method of claim 31, wherein a second placeholder symbol is used to represent a missing vowel in each two-set token comprising zero vowels.

33. The method of claim 32, wherein if the first tokenized set comprises a different number of tokens as the second tokenized set, further comprising the step of performing three-step tokenization.

34. The method of claim 33, wherein the step of performing three-step tokenization comprises the steps of:
   a. in real time, tokenizing at the microprocessor the first character string and the second character string to create a third tokenized set comprising a plurality of third tokens from the first character string and a fourth tokenized set comprising a plurality of fourth tokens from the second character string, wherein each of the third and fourth tokens comprises at least one leading consonant or leading consonant placeholder, at least one vowel or vowel placeholder, and at least one trailing consonant or trailing consonant placeholder;
   b. in real time, after the tokenizing step analyzing at the microprocessor each third token from the third tokenized set and a corresponding fourth token from the fourth tokenized set to determine if the third tokenized set comprises an equal number of tokens as the fourth tokenized set;
   c. if the third tokenized set comprises an equal number of tokens as the fourth tokenized set, analyzing in real time the characters in each of the third tokens in the third tokenized set and the characters in the corresponding fourth token from the fourth tokenized set to determine if the first character string and the second character string are phonetically equivalent, wherein said analyzing step is performed using a second compiled language library (CLL) comprising a set of consonants, a set of vowels, and a plurality of leading consonant equivalencies, vowel equivalencies, and trailing consonant equivalencies, wherein a correspondence exists if the characters in each of the third tokens in the third tokenized set are identical to the characters in the corresponding fourth token from the fourth tokenized set or if the third tokens in the third tokenized set are phonetically equivalent to the characters in the corresponding fourth token from the fourth tokenized set; and
   d. if a correspondence exists in immediately foregoing step (c), outputting in real time a result from the microprocessor across the network indicating that the potential customer's identity is verified, and if a correspondence does not exist in immediately foregoing step (c), outputting in real time a result from the microprocessor across the network indicating that the potential customer's identity is not verified.

35. The method of claim 34, further comprising the steps of calculating a similarity measure between the first character string and the second character string, and output from the microprocessor across the network the similarity measure.

36. The method of claim 35, wherein the calculation of the similarity measure comprises a Levenshtein distance calculation.

37. The method of claim 34, wherein the first CLL and second CLL are stored in a single file on a computer-readable medium in communication with the microprocessor.

38. The method of claim 34, wherein the first CLL and second CLL are resident in a RAM memory in communication with the microprocessor.

39. A computer-implemented method for building a compiled language library for establishing the equivalence of words, comprising the steps of:
   a. receiving at a processor from a computer-readable medium in communication with the processor a user-defined language specification (UDLS), wherein the UDLS comprises a plurality of consonants, a plurality of vowels, and a plurality of sets of equivalent terms, wherein each set of equivalent terms comprises a first term and a second term that differ in spelling but are phonetically equivalent, and wherein each of the first and second term comprise a character string;
   b. for each of the plurality of sets of equivalent terms, tokenizing at the processor the first term and the second term to create a first tokenized set comprising a plurality of first tokens from the first term and a second tokenized set comprising a plurality of second tokens from the second term, wherein each of the first tokens and second tokens comprises at least one consonant from the UDLS or consonant placeholder, and at least one vowel from the UDLS or vowel placeholder, wherein the tokenizing step comprises two-set tokenization comprising the step of combining groups of zero or one consonants into a consonant set and combining groups of zero or one vowels into a vowel set to create a two-set token;
   c. comparing at the processor each first token from the first tokenized set with a corresponding second token from the second tokenized set to determine if the first tokenized set comprises an equal number of tokens as the second tokenized set;
   d. if the first tokenized set comprises an equal number of tokens as the second tokenized set, comparing the consonants or consonant placeholders and vowels or vowel placeholders in each of the first tokens in the first tokenized set to the consonants or consonant placeholders and vowels or vowel placeholders in the corresponding second token from the second tokenized set to determine if the characters are identical, and if the characters are not identical then creating a rule indicating the equivalency of the consonants or consonant placeholders and vowels or vowel placeholders, and writing the rule to a first compiled language library (CLL);
   e. storing the first CLL on the computer-storage medium;
   f. if the first tokenized set comprises a different number of tokens as the second tokenized set, further comprising the step of performing three-step tokenization, wherein the step of performing three-step tokenization comprises the steps of:
      i. tokenizing at the processor the first term and the second term to create a third tokenized set comprising a plurality of third tokens from the first term and a fourth tokenized set comprising a plurality of fourth tokens from the second term, wherein each of the third and fourth tokens comprises at least one leading consonant or leading consonant placeholder, at least one vowel or vowel placeholder, and at least one trailing consonant or trailing consonant placeholder, further wherein the three-step tokenization step comprises the step of combining groups of zero or one leading consonants into a leading consonant set, combining groups of zero or one vowels into a vowel set, and combining groups of zero or one trailing consonants into an optional trailing consonant to create a three-set token, and further wherein a first symbol is used to represent a missing leading consonant in each three-set token comprising zero leading consonants;

ii. comparing at the processor each third token from the third tokenized set with a corresponding fourth token from the fourth tokenized set to determine if the third tokenized set comprises an equal number of tokens as the fourth tokenized set;

iii. if the third tokenized set comprises an equal number of tokens as the fourth tokenized set, comparing the characters in each of the third tokens in the third tokenized set to the characters in the corresponding fourth token from the fourth tokenized set to determine if the characters are identical, and if the characters are not identical then creating a rule indicating the equivalency of the leading consonants or leading consonant placeholders, vowels or vowel placeholders, and trailing consonants or trailing consonant placeholders, and writing the rule to a second compiled language library (CLL); and g. storing the second CLL on the computer-storage medium.

40. The computer-implemented method of claim 39, wherein a second symbol is used to represent a missing vowel in each three-set token comprising zero vowels.

41. The computer-implemented method of claim 40, wherein a third symbol is used to represent a missing optional trailing consonant in each three-set token comprising zero trailing consonants.

* * * * *